United States Patent [19]

Zapushek et al.

[11] Patent Number: 4,844,650
[45] Date of Patent: Jul. 4, 1989

[54] THROTTLE CONNECTOR ASSEMBLY

[75] Inventors: John B. Zapushek, Racine, Wis.; Thomas Wrona, Waukegan, Ill.

[73] Assignee: Outboard Marine Corporation, Waukegan, Ill.

[21] Appl. No.: 186,003

[22] Filed: Apr. 25, 1988

[51] Int. Cl.$^4$ ............................................. F16C 11/00
[52] U.S. Cl. .................................. 403/197; 74/502.4; 384/209; 403/71; 403/195; 440/87
[58] Field of Search ................. 403/71, 195, 197, 238, 403/165; 74/502.4, 502.6; 411/172, 173, 432, 433, 512, 522; 16/2, 108, 109; 384/208, 209, 210; 440/67, 83

[56] References Cited

U.S. PATENT DOCUMENTS

| 511,039 | 12/1893 | Bowen | 403/195 |
|---|---|---|---|
| 1,364,529 | 1/1921 | Thomas, Jr. | 285/162 |
| 2,236,130 | 3/1941 | Betebenner | 285/6.5 |
| 2,465,844 | 3/1949 | Brushaber | 285/6.5 |
| 2,592,949 | 4/1952 | Philipson | 286/16 |
| 2,899,220 | 8/1959 | Abrams | 287/20 |
| 4,364,284 | 12/1982 | Tani et al. | 74/540 |
| 4,581,481 | 4/1986 | Moretti | 174/135 |

Primary Examiner—Andrew W. Kundrat
Assistant Examiner—Arlen Olsen
Attorney, Agent, or Firm—Michael, Best & Friedrich

[57] ABSTRACT

A throttle connector assembly receivable in an aperture formed in a motor cover in a marine propulsion device and operable to retain a throttle cable trunnion in a fixed position relative to the motor cover, the throttle connector assembly comprising a pair of cooperating connector section elements joined for movement between open and closed positions relative to each other and adapted to encircle, when in the closed position, the throttle cable trunnion and to retain the throttle cable trunnion against longitudinal movement relative to said connector section elements, the connector section elements being further adapted to form, when in the closed position, a collar, the collar having an outer surface, a first portion insertible through the aperture in the motor cover, a second portion incapable of passing through the aperture, and a substantially annular groove formed in the outer surface, the throttle connector assembly further comprising a substantially C-shaped retainer receivable in the annular groove and operable when in the annular groove, to prevent passage of the first portion of the collar through the aperture in the motor cover.

20 Claims, 1 Drawing Sheet

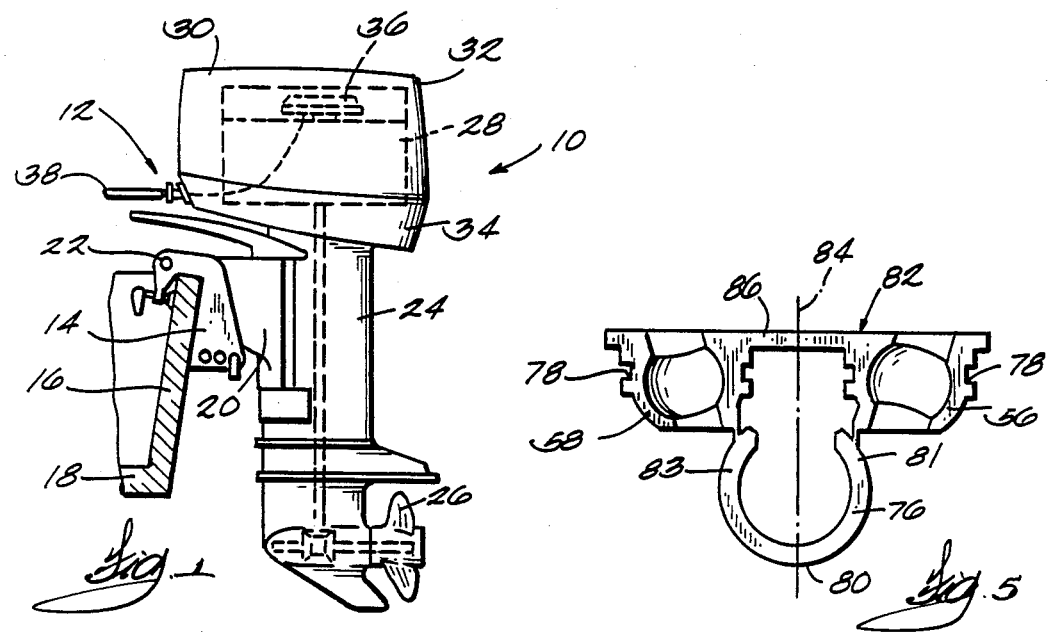
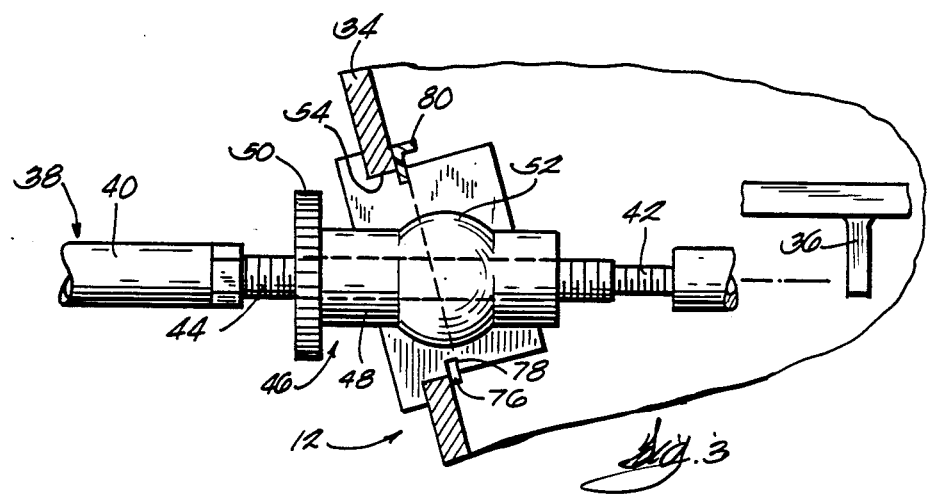
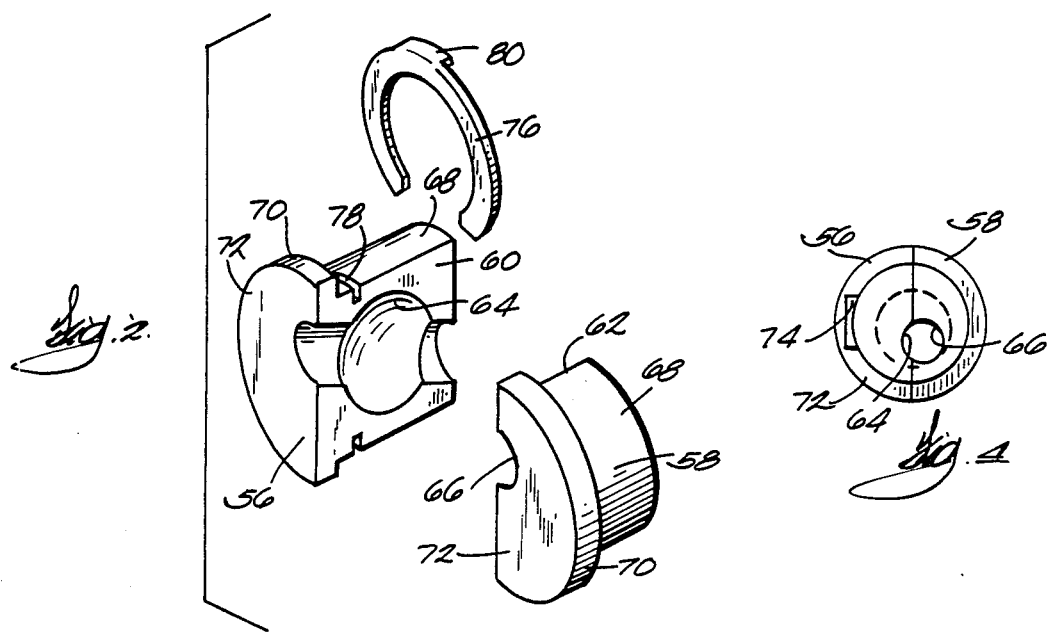

4,844,650

THROTTLE CONNECTOR ASSEMBLY

BACKGROUND OF THE INVENTION

This invention relates generally to marine propulsion devices and, more particularly, to connectors for securing a throttle cable trunnion to a motor cover in a marine propulsion device.

Engine speed in a marine propulsion device is typically controlled by means of a throttle cable having a relatively stationary outer sheath and a movable inner cable. The outer sheath is fixed to the motor housing by means of a throttle connector assembly which rotatably supports a throttle cable trunnion. The throttle cable trunnion threadedly engages the outer sheath of the cable, and manual rotation of the throttle cable trunnion permits adjustment of the position of the outer sheath relative to the motor housing. This, in turn, permits adjustment of the throttle linkage control limits.

Known throttle connector assemblies include a two-piece connector having a molded plastic portion and a mating spring metal retainer.

Attention is directed to the following U.S. Patents:

| Patent No. | Inventor | Issued |
| --- | --- | --- |
| 4,581,481 | Moretti | April 8 1986 |
| 4,364,284 | Tani et al. | December 21, 1982 |
| 2,899,220 | R. Abrams | August 11, 1959 |
| 2,592,949 | J. Philipson | April 15 1952 |
| 2,465,844 | H. J. Brushaber | March 29, 1949 |
| 2,236,130 | H. E. Betebenner | March 25, 1941 |
| 1,364,529 | G. C. Thomas, Jr. | January 4, 1921 |
| 511,039 | G. M. Bowen | December 19, 1893 |

SUMMARY OF THE INVENTION

The invention provides a throttle connector assembly receivable in an aperture formed in a motor cover in a marine propulsion device and operable to retain a throttle cable trunnion in a fixed position relative to the motor cover, the throttle connector assembly comprising a pair of cooperating connector section elements adapted to encircle the throttle cable trunnion and form around the throttle cable trunnion a collar having a first portion capable of passing through the aperture in the motor cover and having a second portion incapable of passing through the aperture, and means engageable with the first portion for preventing withdrawal of the first portion through the aperture following engagement of the means with the first portion.

The invention also provides a throttle connector assembly comprising a one-piece molded structure having a pair of substantially complementary connector section elements symmetrically formed on opposite sides of a fold line and having a retainer portion integrally molded with and releaseable from at least one of the connector section elements.

The invention also provides a throttle connector assembly receivable in an aperture formed in a motor cover in a marine propulsion device and operable to retain a throttle cable trunnion in a fixed position relative to the motor cover, the throttle connector assembly comprising a pair of cooperating connector section elements joined for movement between open and closed positions relative to each other and adapted to encircle, when in the closed position, the throttle cable trunnion and to retain the throttle cable trunnion against longitudinal movement relative to the connector section elements, the connector section elements being further adapted to form, when in the closed position, a collar, the collar having an outer surface, a first portion insertable through the aperture in the motor cover, a second portion incapable of passing through the aperture, and a substantially annular groove formed in the outer surface, the throttle connector assembly further comprising a substantially C-shaped retainer receivable in the annular groove and operable when in the annular groove to prevent passage of the first portion of the collar through the aperture in the motor cover.

In one embodiment, the connector section elements are adapted to permit rotation of the throttle cable trunnion while opposing longitudinal movement of the throttle cable trunnion In one embodiment, the cooperating connector section elements and the retainer are each formed of molded plastic.

In one embodiment, the connector section elements and the C-shaped retainer are adapted to be molded as a unitary structure.

In one embodiment, the C-shaped retainer is adapted to be separable from the adjoining ones of the connector section elements in the molded unitary structure.

A principal feature of the present invention is the provision of a throttle connector assembly formed entirely of molded plastic.

Another principal feature of the present invention is the provision of a throttle cable assembly wherein all elements of the assembly can be molded as a unitary structure.

Another principal feature of the present invention is the provision of a throttle cable assembly which securely retains a throttle cable trunnion against axial movement relative to a motor cover while permitting rotational movement of the throttle cable trunnion relative to the motor cover.

Another principal feature of the present invention is the provision of a throttle connector assembly capable of mounting a throttle cable trunnion to a surface of a motor cover which is skewed relative to the axis of the throttle cable trunnion.

Other principal features and advantages of the invention will become apparent to those skilled in the art upon review of the following detailed description, claims and drawings.

DESCRIPTION OF THE DRAWINGS

FIG. 1 is a side elevational view of a marine propulsion device embodying various of the features of the invention and including a throttle connector assembly for connecting a throttle cable trunnion to a motor cover.

FIG. 2 is an exploded perspective view of the throttle connector assembly.

FIG. 3 is a cross-sectional view showing the throttle connector assembly in place on the motor cover of the marine propulsion device.

FIG. 4 is an end view of the throttle connector assembly.

FIG. 5 is side elevational view of a unitary molded part or structure including each of the elements of the throttle connector assembly, useful in understanding the manufacture of the throttle connector assembly.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine propulsion device 10 including a throttle connector assembly 12 embodying the invention is illustrated in the drawings. As best shown in FIG. 1, the marine propulsion device 10 comprises a transom bracket 14 mounted on the transom 16 of a boat 18 and a swivel bracket 20 mounted on the transom bracket 14 for pivotal movement relative to the transom bracket 14 about a generally horizontal tilt axis 22.

The marine propulsion device also comprises a propulsion unit 24 including a rotatably mounted propeller 26, and an engine 28 drivingly connected to the propeller 26. The engine 28 is housed within a housing 30 formed of an upper motor cover 32 and a lower motor cover 34. The engine 28 includes a throttle assembly 36 of known construction and further includes a throttle cable 38 operable to advance or retard the throttle assembly 36 in accordance with an operator's commands. In the illustrated embodiment, the throttle cable 38 joins the propulsion unit 24 at the forward end of the lower motor cover 34 and is connected to the lower motor cover 34 by means of the throttle connector assembly 12.

Referring to FIG. 3, the throttle cable 38 includes an outer sheath 40 and an inner cable 42 movable axially within the sheath 40. The outer sheath 40 terminates in a hollow, externally threaded, rigid tubular portion 44 which is threadedly received in an internally threaded, axially extending bore formed through a generally cylindrical throttle cable trunnion 46. The throttle cable trunnion 46 includes a generally cylindrical trunk portion 48, and the forward end of the trunk portion terminates in an enlarged, knurled knob portion 50 dimensioned and shaped to be easily grasped and rotated by an operator's fingers. Between the ends of the trunk portion 48, the throttle cable trunnion 46 further includes an enlarged spherical bearing portion 52 comprising an outwardly directed, substantially spherical bulge. Preferably, the throttle cable trunnion 46 comprises a unitary structure formed of a durable molded plastic.

As further illustrated in FIG. 3, an aperture 54 is formed through the forward wall of the lower motor cover 34, and the throttle cable trunnion 46 is supported for rotation around its axis, and within the aperture 54, by means of the throttle connector assembly 12. Preferably, the throttle connector assembly 12 retains the throttle cable trunnion 46 against axial movement relative to the lower motor cover 34 while permitting rotational movement of the throttle cable trunnion 46 around its axis. Accordingly, rotation of the throttle cable trunnion 46 around its axis has the effect of pulling or pushing the threaded portion 44 of the throttle cable sheath 40 inwardly or outwardly relative to the lower motor cover 34. This has the effect of permitting adjustment of the axial position of the throttle cable sheath 40 relative to the propulsion unit housing 30, which has the further effect of permitting adjustment of the range of control provided to the operator through the throttle cable 38.

Referring to FIGS. 2, 3 and 4, the throttle connector assembly 12 comprises a pair of cooperating connector section elements 56, 58 adapted to form a generally cylindrical collar around the spherical bearing portion 52 of the throttle cable trunnion 46. In the illustrated embodiment, each of the connector section elements 56, 58 is substantially semi-cylindrical in form and includes a planar face 60, 62 having therein formed a recess 64, 66 corresponding in size and shape to the size and shape of the exterior of the throttle cable trunnion 46 in the area of the spherical bearing portion 52. When the connector section elements 56, 58 are positioned adjacent each other as shown in FIG. 4, the recesses 64, 66 formed in the flat faces 60, 62 together define an interior recess dimensioned to receive and rotatably support the throttle cable trunnion 46. By reason of the enlarged spherical bearing portion 52, rotation of the throttle cable trunnion 46 is permitted while axial movement relative to the connector section elements 56, 58 is opposed.

As further illustrated, one end or first portion 68 of the collar formed by the connector section elements 56, 58 is shaped and dimensioned so as to be insertable through the aperture 54 formed in the lower motor cover 34. The other end or second portion 70 of the collar is incapable of passing through the aperture 54 and preferably includes an enlarged head 72 of dimension greater than the dimension of the aperture 54. In addition, a key 74 is formed along the exterior of one of the connector section elements 56 adjacent the enlarged head 72 and is received in a corresponding keyway (not shown) formed in the lower motor cover 34 so as to maintain a fixed orientation of the throttle connector assembly 12 relative to the lower motor cover 34.

To prevent unintended withdrawal of the assembled connector section elements 56, 58 from the aperture 54 in the lower motor cover 34, the throttle connector assembly 12 further includes means engageable with the first portion 68 of the collar for preventing withdrawal of the collar through the aperture 54 following engagement with the collar. Although various suitable means can be used, in the illustrated embodiment, such means comprises a substantially C-shaped retainer 76 preferably formed of the same molded, durable plastic forming the connector section elements 56, 58. In addition, an annular groove 78 is formed in the exterior surfaces of each of the connector section elements 56, 58 at a distance from the inner side of the enlarged head portion 72 substantially equal to the thickness of the lower motor cover 34. The grooves 78 thus formed cooperate to form an annular groove, extending around the circumference of the assembled collar, dimensioned to receive therein the C-shaped retainer 76.

As best seen in FIG. 3, after the connector section elements 56, 58 have been assembled around the throttle cable trunnion 46 and the resulting assembly inserted through the aperture 54 in the lower motor cover 34, the C-shaped retainer 76 is pressed downwardly over the assembled collar and into the annular groove 78 so as to prevent withdrawal of the collar through the aperture 54. Preferably, an outwardly extending tab 80 is formed along the upper edge of the C-shaped retainer 76 to facilitate installation and removal of the C-shaped retainer 76.

In many marine propulsion devices, the surface of the lower motor cover 34 through which the throttle cable 38 extends will be skewed relative to the axis of the throttle cable 38. Accordingly, the recesses 64, 66 formed in the faces 60, 62 of the connector section elements 56, 58 are preferably angularly offset from the axis of the assembled collar so as to compensate for the skewed orientation of the wall of the lower motor cover 34.

Referring to FIG. 5, the throttle connector assembly 12 is preferably arranged to be molded as a single unitary part or structure 82. To this end, the connector section elements 56, 58 are symmetrically formed on opposites sides of a fold line 84, and the C-shaped retainer 76 is integrally molded with, and releaseable from, at least one of the connector section elements 56, 58. As illustrated, the C-shaped retainer 76 is, preferably, also symmetrically formed on opposite sides of the fold line 84 so that each of its ends 81, 83 joins one of the connector section elements 56, 58. Preferably, the junctures with the connector section elements 56, 58 comprise regions of reduced thickness so that, after molding, the C-shaped retainer 76 can be easily separated from the connector section elements 56, 58 to facilitate installation of the throttle connector assembly 12.

As illustrated in FIG. 2, the connector section elements 56, 58 can comprise two separate members. Alternatively, a bridging hinge portion 86 (FIG. 5) can be left between the connector section elements 56, 58 so as to form a hinge joining the connector section elements 56, 58 for movement between opened and closed positions relative to each other around the throttle cable trunnion 46. By providing such a hinge 86, the connector section halves 56, 58 remain joined to each other and installation of the throttle connector assembly 12 can be simplified.

Once the throttle connector assembly 12 has been installed as illustrated in FIG. 3, the throttle cable trunnion 46 can be rotated so as to adjust the position of the throttle cable outer sheath 40 relative to the lower cover 34. Preferably, the dimensions of the throttle cable trunnion 46, and the throttle connector assembly 12, are such that sufficient friction is developed to prevent inadvertent rotation of the throttle cable trunnion 46 while the marine propulsion device 10 is in operation. However, the friction should not be so great as to prevent manual adjustment of the throttle cable trunnion 46 when adjustment is required Various other features and advantages of the invention are set forth in the following claims.

We claim:

1. A throttle connector assembly receivable in an aperture formed in a motor cover in a marine propulsion device and operable to retain a throttle cable trunnion in a fixed position relative to the motor cover, said throttle connector assembly comprising a pair of cooperating connector section elements adapted to encircle the throttle cable trunnion and form around the throttle cable trunnion a collar having a first portion capable of passing through the aperture in the motor cover and having a second portion incapable of passing through the aperture, and means engageable with said first portion for preventing withdrawal of said first portion through the aperture following engagement of said means with said first portion.

2. A throttle connector assembly in accordance with claim 1 wherein said connector section elements are adapted to permit rotation of the throttle cable trunnion while opposing longitudinal movement of the throttle cable trunnion.

3. A throttle connector assembly in accordance with claim 1 wherein said means engageable with said first portion comprises a substantially C-shaped retainer adapted to at least partially encircle said first portion of said collar.

4. A throttle connector assembly in accordance with claim 3 wherein said first portion of said collar includes an annular groove for receiving therein said C-shaped retainer.

5. A throttle connector assembly in accordance with claim 4 wherein said second portion of said collar includes an enlarged head portion having a dimension greater than the dimension of the aperture formed in the motor cover.

6. A throttle connector assembly in accordance with claim 5 wherein said cooperating connector section elements are shaped so that the exterior shape of said first portion is substantially cylindrical.

7. A throttle connector assembly in accordance with claim 6 wherein said cooperating connector section elements and said C-shaped retainer are each formed of molded plastic.

8. A throttle connector assembly in accordance with claim 7 wherein said cooperating connector section elements and said C-shaped retainer are adapted to be molded as a unitary structure.

9. A part molded for a throttle connector assembly comprising a one-piece molded structure having a pair of substantially complementary connector section elements symmetrically formed on opposite sides of a fold line, and a retainer portion integrally molded with one of said connector section elements separable from said one of said connector section elements.

10. A part molded for a throttle connector assembly in accordance with claim 9 wherein each of said complementary connector section elements has the general shape of one-half of a longitudinally bisected cylinder whereby each of said connector section elements includes a substantially flat face and a substantially semi-cylindrical outer surface.

11. A part molded for a throttle connector assembly in accordance with claim 10 wherein said flat face of each of said connector section elements includes a hollow depression shaped so as to conform to at least a portion of the exterior shape of a throttle cable trunnion.

12. A part molded for a throttle cable assembly in accordance with claim 9 wherein said retainer portion is substantially C-shaped.

13. A part molded for a throttle connector assembly in accordance with claim 12 wherein said C-shaped retainer includes one end integrally molded with one of said connector section elements and another end integrally molded with the other of said connector section elements.

14. A part molded for a throttle connector assembly in accordance with claim 13 wherein said ends of said C-shaped retainer are separable from said connector section elements.

15. A part molded for a throttle connector assembly in accordance with claim 14 wherein said connector section elements are adapted to be folded toward each other along said fold line following separation of said C-shaped retainer.

16. A throttle connector assembly receivable in an aperture formed in a motor cover in a marine propulsion device and operable to retain a throttle cable trunnion in a fixed position relative to the motor cover, said throttle connector assembly comprising a pair of cooperating connector section elements joined for movement between open and closed positions relative to each other and adapted to encircle, when in the closed position, the throttle cable trunnion and to retain the throttle cable trunnion against longitudinal movement relative to said connector section elements, said connector section elements being further adapted to form, when in the closed position, a collar, the collar having a first portion insertible through the aperture in the motor cover and including an outer surface, a second portion incapable of passing through the aperture, and a substantially annular groove formed in said outer surface, said throttle connector assembly further comprising a substantially C-shaped retainer receivable in said annular groove and operable when in said annular groove, to prevent passage of said first portion of said collar through the aperture in the motor cover.

17. A throttle connector assembly in accordance with claim 16 wherein said outer surface of said collar is substantially cylindrical.

18. A throttle connector assembly in accordance with claim 17 wherein said end incapable passing through the aperture includes a substantially cylindrical head portion of greater dimension than the dimension of the aperture.

19. A throttle connector assembly in accordance with claim 18 wherein said collar further includes a key formed on said outer surface and shaped to be receivable in a key way formed in the motor cover so as to oppose rotation of said collar relative to the motor cover when said collar is received in the aperture.

20. A throttle connector assembly in accordance with claim 19 wherein said cooperating connector section elements permit rotation of the throttle cable trunnion while opposing longitudinal movement of the throttle cable trunnion relative to said connector section elements.

* * * * *